United States Patent
Murata et al.

(10) Patent No.: US 12,497,061 B2
(45) Date of Patent: Dec. 16, 2025

(54) NOTIFICATION CONTROL METHOD AND NOTIFICATION CONTROL DEVICE

(71) Applicant: TOYOTA JIDOSHA KABUSHIKI KAISHA, Toyota (JP)

(72) Inventors: Soshiro Murata, Toyota (JP); Hiroshi Umeno, Nisshin (JP); Takahiro Nomura, Okazaki (JP); Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 18/514,488

(22) Filed: Nov. 20, 2023

(65) Prior Publication Data

US 2024/0208525 A1 Jun. 27, 2024

(30) Foreign Application Priority Data

Dec. 27, 2022 (JP) ................. 2022-210065

(51) Int. Cl.
  *B60W 50/14* (2020.01)
  *B60L 58/13* (2019.01)
  *B60W 50/02* (2012.01)

(52) U.S. Cl.
  CPC ............ *B60W 50/14* (2013.01); *B60L 58/13* (2019.02); *B60W 50/0205* (2013.01);
  (Continued)

(58) Field of Classification Search
  CPC ............ B60W 50/14; B60W 50/0205; B60W 2050/021; B60W 2050/143;
  (Continued)

(56) References Cited

U.S. PATENT DOCUMENTS

2018/0358825 A1* 12/2018 Choi .................. G01R 31/66
2023/0322121 A1 10/2023 Wang et al.

FOREIGN PATENT DOCUMENTS

CN 113263947 A 8/2021
CN 114670699 A 6/2022
(Continued)

*Primary Examiner* — Brian A Zimmerman
*Assistant Examiner* — Cal J Eustaquio
(74) *Attorney, Agent, or Firm* — Dinsmore & Shohl LLP

(57) ABSTRACT

A notification control method is a method of control by a notification control device that causes a notification apparatus to give information on a replacement apparatus for a battery where electric power for travel is stored, the battery being mounted on a vehicle. The notification control method includes obtaining from the replacement apparatus, abnormality occurrence information relating to replacement of the battery, obtaining from the replacement apparatus or the vehicle, travel-enabled-state information indicating that the battery is in an attachment state in which the vehicle is able to travel, causing the notification apparatus to give first information indicating that the vehicle is able to travel when the abnormality occurrence information and the travel-enabled-state information are obtained, and causing the notification apparatus to give second information indicating that the vehicle is unable to travel when the abnormality occurrence information is obtained and the travel-enabled-state information is not obtained.

9 Claims, 3 Drawing Sheets

(52) U.S. Cl.
CPC ....... *B60L 2250/10* (2013.01); *B60L 2250/16* (2013.01); *B60W 2050/021* (2013.01); *B60W 2050/143* (2013.01); *B60W 2050/146* (2013.01); *B60W 2510/242* (2013.01)

(58) Field of Classification Search
CPC ....... B60W 2050/146; B60W 2510/242; B60L 58/13; B60L 2250/10; B60L 2250/16; B60L 3/00; B60L 53/30; B60L 53/66; B60L 53/80; B60L 53/68; G08B 21/24; G08B 5/22; G08B 21/185; G08B 21/18; B60Y 2200/91; Y02T 90/16
See application file for complete search history.

(56) References Cited

FOREIGN PATENT DOCUMENTS

| | | |
|---|---|---|
| CN | 112606691 B | 9/2022 |
| EP | 3725604 A1 | 10/2020 |
| JP | 2011-518710 A | 6/2011 |
| WO | 2010/033883 A1 | 3/2010 |

\* cited by examiner

1

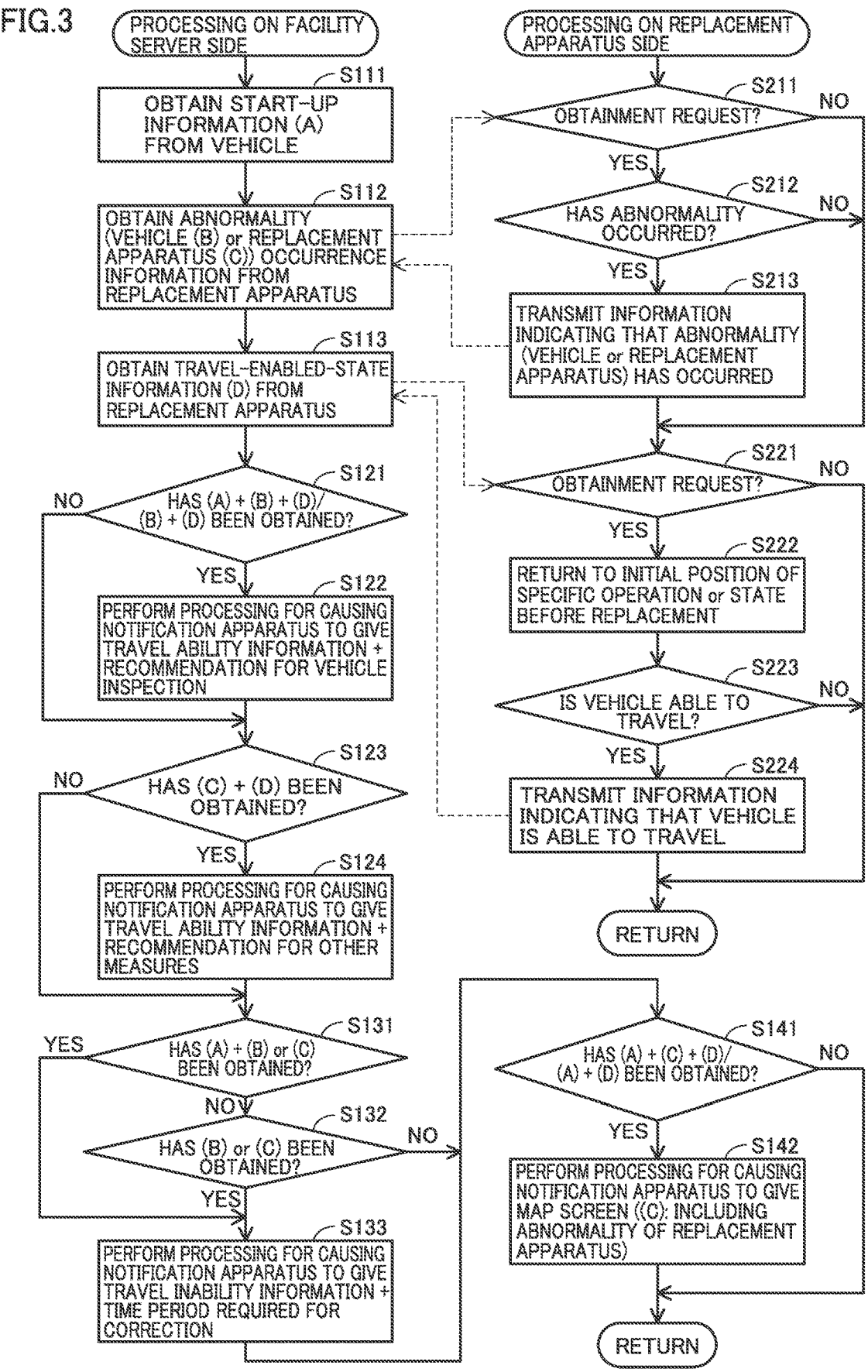

NOTIFICATION CONTROL METHOD AND NOTIFICATION CONTROL DEVICE

CROSS REFERENCE TO RELATED APPLICATIONS

This nonprovisional application is based on Japanese Patent Application No. 2022-210065 filed with the Japan Patent Office on Dec. 27, 2022, the entire contents of which are hereby incorporated by reference.

BACKGROUND

Field

This disclosure relates to a notification control method and a notification control device, and particularly to a notification control method by a notification control device that causes a notification apparatus to give information on a replacement apparatus that replaces a power storage where electric power to be used for travel is stored, the power storage being mounted on a vehicle, and a notification control device that causes a notification apparatus to give information on a replacement apparatus that replaces a power storage where electric power to be used for travel is stored, the power storage being mounted on a vehicle.

Description of the Background Art

In a battery exchange station (see, for example, Japanese National Patent Publication No. 2011-518710) that exchanges a battery of an electrically powered vehicle such as a battery electric vehicle, when an abnormality occurs in the middle of exchange, depending on a state of the abnormality, an operation for exchange may be repeated or someone may be called for addressing the abnormality.

SUMMARY

A user of the vehicle, however, is unable to know the state of the abnormality, and hence, disadvantageously, the user is unable to take appropriate measures such as movement of the vehicle.

This disclosure was made to solve such a problem, and an object thereof is to provide a notification control method and a notification control device that allow a user of a vehicle to take appropriate measures.

A notification control method according to this disclosure is a notification control method by a notification control device that causes a notification apparatus to give information on a replacement apparatus that replaces a power storage where electric power to be used for travel is stored, the power storage being mounted on a vehicle. The notification control method includes obtaining from the replacement apparatus, by the notification control device, abnormality occurrence information relating to replacement of the power storage, obtaining from the replacement apparatus or the vehicle, by the notification control device, travel-enabled-state information indicating that the power storage is in an attachment state in which the vehicle is able to travel, causing, by the notification control device, the notification apparatus to give first information indicating that the vehicle is able to travel when the abnormality occurrence information and the travel-enabled-state information are obtained, and causing, by the notification control device, the notification apparatus to give second information indicating that the vehicle is unable to travel when the abnormality occurrence information is obtained and the travel-enabled-state information is not obtained.

According to such a configuration, on the occurrence of an abnormality in connection with replacement of the power storage of the vehicle, so long as the power storage is in the attachment state in which the vehicle is able to travel, the notification apparatus gives information indicating that the vehicle is able to travel to the user. On the other hand, when the power storage is not in the attachment state in which the vehicle is able to travel, the notification apparatus gives information indicating that the vehicle is unable to travel to the user. Therefore, when the vehicle is abnormal in connection with replacement of the power storage whereas the replacement apparatus is normal, so long as the power storage is in the attachment state in which the vehicle is able to travel, in response to the notification that the vehicle is able to travel, the user takes the vehicle out of the replacement apparatus, so that the abnormality of the vehicle can be addressed outside the replacement apparatus and a power storage of another vehicle can be replaced by the replacement apparatus. When the replacement apparatus is abnormal in connection with replacement of the power storage, so long as the power storage is in the attachment state in which the vehicle is able to travel, in response to the notification that the vehicle is able to travel, the user takes the vehicle out of the replacement apparatus, which facilitates repair works for the replacement apparatus. Consequently, the notification control method that allows the user of the vehicle to take appropriate measures can be provided.

The notification apparatus may be provided in the vehicle, and when the abnormality occurrence information is obtained and the travel-enabled-state information is not obtained, the notification apparatus may be supplied with electric power from an auxiliary battery of the vehicle.

According to such a configuration, even when the abnormality in connection with replacement of the power storage of the vehicle occurs and electric power cannot be supplied from the power storage, electric power can be supplied from the auxiliary battery to the notification apparatus of the vehicle. Consequently, even when the abnormality in connection with replacement of the power storage occurs, information can be conveyed to the user.

The notification control method may further include obtaining from the vehicle, by the notification control device, start-up information indicating that the vehicle has been started up, causing, by the notification control device, the notification apparatus to give third information different from the first information and the second information when the travel-enabled-state information and the start-up information are obtained, and causing, by the notification control device, the notification apparatus to give the first information or the second information rather than the third information when the abnormality occurrence information and the start-up information are obtained.

According to such a configuration, so long as the abnormality in connection with replacement of the power storage has not occurred at the time of start-up of the vehicle while the power storage is in the attachment state in which the vehicle is able to travel, the third information different from information indicating whether or not the vehicle is able to travel is given to the user. When the abnormality in connection with replacement of the power storage has occurred at the time of start-up of the vehicle, the information indicating whether or not the vehicle is able to travel rather than the third information is given to the user. Consequently, by preferentially giving necessary information depending on a situation, information can appropriately be conveyed to the user.

The notification control method may further include obtaining from the replacement apparatus or the vehicle, by the notification control device, vehicle normality information indicating that the vehicle is normal and causing, by the notification control device, the notification apparatus to give the third information when the vehicle normality information and the start-up information are obtained regardless of obtainment of the abnormality occurrence information and the travel-enabled-state information.

According to such a configuration, when the vehicle is normal in spite of the fact that the abnormality in connection with replacement of the power storage has occurred but the power storage is in the attachment state in which the vehicle is able to travel, information different from the information indicating whether or not the vehicle is able to travel is given to the user. Consequently, the user can be given such an impression that the vehicle is normal.

The notification control method may further include obtaining, by the notification control device, abnormal apparatus information indicating in which of the replacement apparatus and the vehicle an abnormality has occurred when the abnormality occurrence information is obtained and causing, by the notification control device, the notification apparatus to give information different depending on in which of the replacement apparatus and the vehicle the abnormality has occurred when the abnormal apparatus information is obtained.

According to such a configuration, when the abnormal apparatus information indicates that it is the vehicle where the abnormality has occurred, recommendation for inspection of the vehicle on the spot without the vehicle reaching a public roadway can be given after the vehicle is taken out of the replacement apparatus. When the abnormal apparatus information indicates that it is the replacement apparatus where the abnormality has occurred, recommendation for replacement of the power storage by another replacement apparatus or external charging of the power storage can be given.

The power storage being in the attachment state in which the vehicle is able to travel may be determined while the replacement apparatus is in a state of standstill at an initial position of a specific operation during replacement of the power storage.

According to such a configuration, determination that the power storage is in the attachment state in which the vehicle is able to travel can more appropriately be made when the determination is made in the state of standstill at the initial position of the specific operation than when the determination is made in the state of standstill at a position during the specific operation.

The power storage being in the attachment state in which the vehicle is able to travel may be determined in a state in which return to a state before start of replacement of the power storage has been completed.

According to such a configuration, determination that the power storage is in the attachment state in which the vehicle is able to travel can more appropriately be made when the determination is made in the state in which return to the state before start of replacement of the power storage has been completed than when the determination is made in a state in which return to the state before start of replacement of the power storage has not been completed.

The notification control method may further include causing, by the notification control device, the notification apparatus to give a notification of a time period required for correction of an abnormality in connection with replacement of the power storage.

According to such a configuration, the user can be notified of the time period required for correction of the abnormality in connection with replacement of the power storage.

According to another aspect of this disclosure, a notification control device is a control device that causes a notification apparatus to give information on a replacement apparatus that replaces a power storage where electric power to be used for travel is stored, the power storage being mounted on a vehicle. The notification control device obtains from the replacement apparatus, abnormality occurrence information relating to replacement of the power storage, obtains from the replacement apparatus or the vehicle, travel-enabled-state information indicating that the power storage is in an attachment state in which the vehicle is able to travel, causes the notification apparatus to give first information indicating that the vehicle is able to travel when the abnormality occurrence information and the travel-enabled-state information are obtained, and causes the notification apparatus to give second information indicating that the vehicle is unable to travel when the abnormality occurrence information is obtained and the travel-enabled-state information is not obtained.

According to such a configuration, the notification control device that allows the user of the vehicle to take appropriate measures can be provided.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a flowchart showing a flow of processing for controlling notification about replacement of a main battery in this embodiment.

DESCRIPTION OF THE EMBODIMENTS

Figure 1:
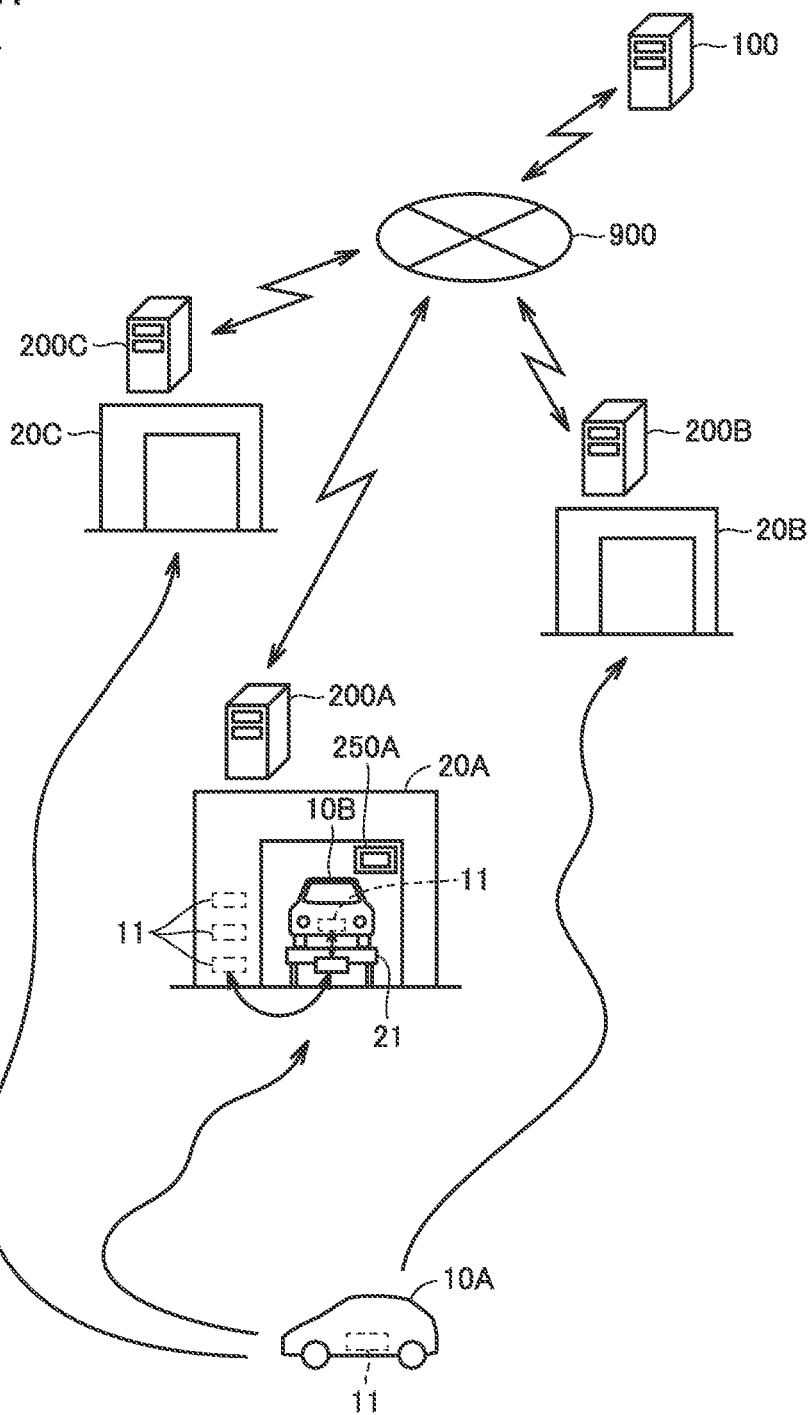
FIG. 1 is a diagram showing a configuration of a battery replacement system according to this embodiment.

An embodiment of the present disclosure will be described in detail below with reference to the drawings. The same or corresponding elements in the drawings have the same reference characters allotted and description thereof will not be repeated.

Figure 2:
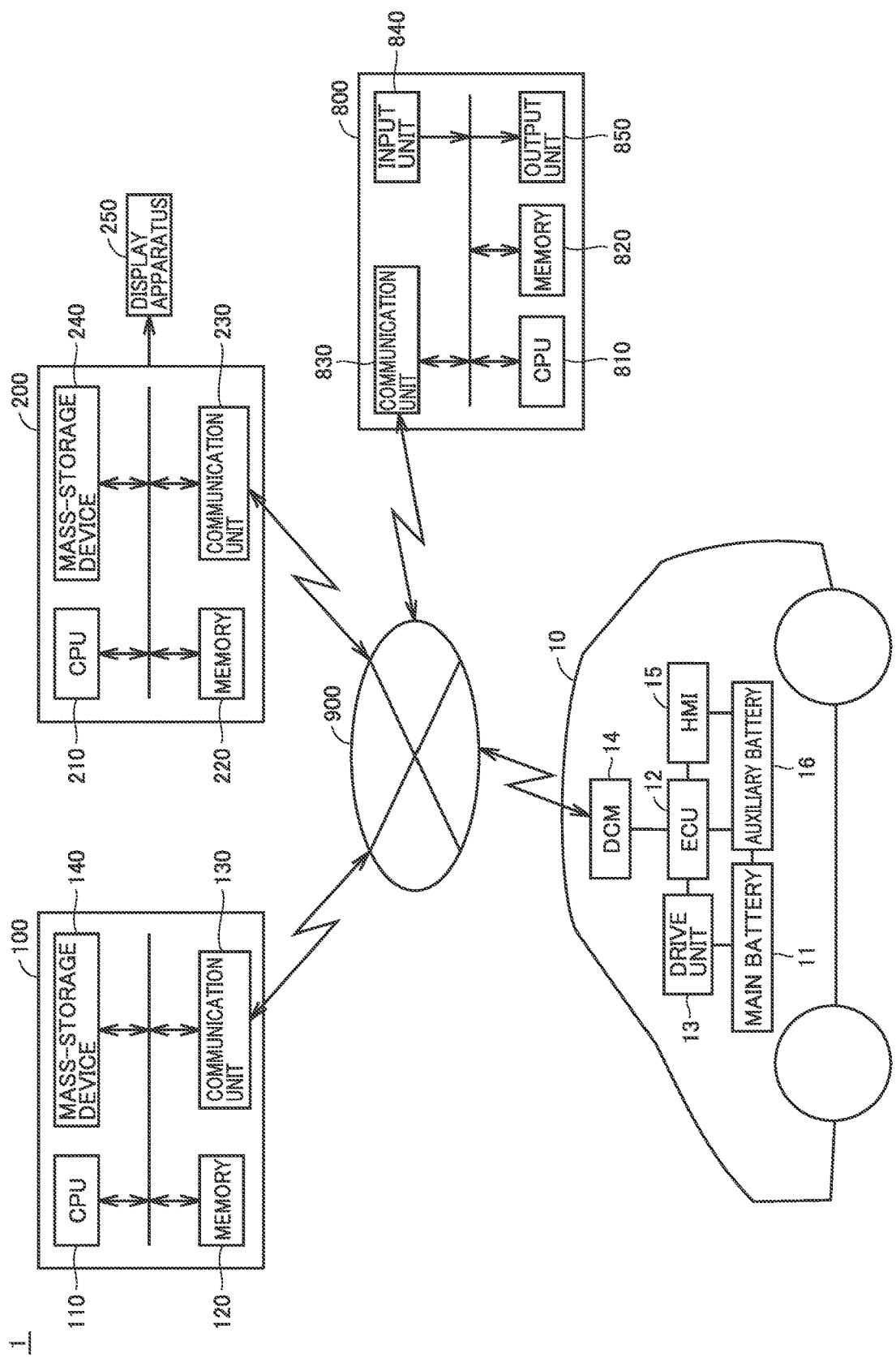
FIG. 2 is a block diagram showing overview of a configuration of each apparatus included in the battery replacement system in this embodiment.

FIG. 1 is a diagram showing a configuration of a battery replacement system 1 according to this embodiment. FIG. 2 is a block diagram showing overview of a configuration of each apparatus included in battery replacement system 1 in this embodiment. Referring to FIGS. 1 and 2, battery replacement system 1 includes a plurality of vehicles 10A and 10B (which are also representatively referred to as a "vehicle 10" below), a plurality of replacement stations 20A to 20C, facility servers 200A to 200C (which are also representatively referred to as a "facility server 200" below) provided in respective replacement stations 20A to 20C (which are also representatively referred to as a "replacement station 20" below) and a display apparatus 250A (which is also representatively referred to as a "display apparatus 250" below), and a management server 100.

Battery replacement system 1 may include a portable terminal 800 carried by a user of vehicle 10. Vehicles 10A and 10B, facility servers 200A to 200C, management server 10, and portable terminal 800 can communicate over a communication network 900.

Vehicle 10 includes a main battery 11, an electronic control unit (ECU) 12, a drive unit 13, a data communication module (DCM) 14, a human machine interface (HMI) 15, and an auxiliary battery 16. Electric power to be used for travel of vehicle 10 is stored in main battery 11, and main battery 11 is mounted on vehicle 10 as being replaceable. Main battery 11 is implemented, for example, by a lithium ion battery. Without being limited as such, main battery 11 may be implemented by another type of battery such as a nickel metal hydride battery or an all-solid-state battery.

Auxiliary battery 16 is implemented, for example, by a lead acid battery. Without being limited as such, auxiliary battery 16 may be implemented by another type of battery such as a lithium ion battery, a nickel metal hydride battery, or an all-solid-state battery. Electric power at a high voltage (for example, several hundred volts) from main battery 11 is down-converted to a low voltage (for example, 12 V) by a direct-current (DC)/DC converter and stored in auxiliary battery 16.

ECU 12 includes a central processing unit (CPU), a memory, and a global positioning system (GPS). ECU 12 operates with electric power supplied by auxiliary battery 16. The memory includes a random access memory (RAM) and a read only memory (ROM), and a program and data to be used by the CPU are stored therein.

The CPU performs prescribed processing defined in the program in accordance with the program and the data stored in the memory and data inputted from the outside, and has data on a result of execution stored in the memory or outputs the data to the outside. The GPS detects position information of vehicle 10 and passes the position information to the CPU.

Drive unit 13 includes a motor generator and an inverter that drives the motor generator with electric power in main battery 11 and charges main battery 11 with electric power regenerated by the motor generator. Drive unit 13 may further include an engine that drives the motor generator or vehicle 10 by operating with fuel. In other words, vehicle 10 may be a battery electric vehicle (BEV) that includes the motor generator but does not include the engine or a hybrid electric vehicle (HEV) or a plug-in hybrid electric vehicle (PHEV) that includes the motor generator and the engine. Vehicle 10 may be a fuel cell electric vehicle (FCEV).

DCM 14 is a module for communication with an external apparatus over communication network 900, and transmits data from ECU 12 to the external apparatus and passes data from the external apparatus to ECU 12. DCM 14 operates with electric power supplied by auxiliary battery 16.

HMI 15 is an apparatus which is provided in the vicinity of a driver's seat of vehicle 10 and accepts information inputted from the user and outputs the information to ECU 12. HMI 15 gives information from ECU 12 to the user by representation or through voice and sound, and includes, for example, a touch panel display. HMI 15 operates with electric power supplied by auxiliary battery 16.

Facility server 200 includes a CPU 210, a memory 220, a communication unit 230, and a mass-storage device 240. Memory 220 includes a random access memory (RAM) and a read only memory (ROM). Communication unit 230 can communicate with an external apparatus over communication network 900, and transmits data from CPU 210 to the external apparatus and passes data from the external apparatus to CPU 210. Mass-storage device 240 is implemented by a hard disk drive (HDD), a solid state drive (SSD), or the like, and a program and data to be used by CPU 210 are stored therein. CPU 210 performs prescribed processing defined in the program in accordance with the program and the data stored in memory 220 and mass-storage device 240 and data inputted from the external apparatus to communication unit 230, and has data on a result of execution stored in memory 220 or mass-storage device 240 or outputs the data to the external apparatus from communication unit 230. Display apparatus 250 is implemented by a display that shows information received from facility server 200 and a speaker that outputs the information by voice and sound.

Replacement station 20 that replaces main battery 11 includes a replacement apparatus 21 and facility server 200. Replacement apparatus 21 includes a processor. Replacement apparatus 21 is controlled by the processor in accordance with a control instruction from facility server 200 to detach main battery 11 of vehicle 10 from vehicle 10, to move detached main battery 11 to a storage location, to start charging of moved main battery 11, to take charged main battery 11 out of the storage location, and to attach taken-out main battery 11 to vehicle 10. In this embodiment, after reservation of replacement of main battery 11 is made, main battery 11 charged to a state of charge (SOC)=80% is charged to the SOC=100% which represents a fully charged state.

Management server 100 includes a CPU 110, a memory 120, a communication unit 130, and a mass-storage device 140. Management server 100 manages replacement of main battery 11 at replacement station 20 in battery replacement system 1. Functions of CPU 110, memory 120, communication unit 130, and mass-storage device 140 of management server 100 are similar to respective functions of CPU 210, memory 220, communication unit 230, and mass-storage device 240 of facility server 200 described previously. Management server 100 is responsible for overall management of battery replacement system 1 such as processing for reservation of replacement of main battery 11 by replacement apparatus 21 at replacement station 20.

Portable terminal 800 includes a CPU 810, a memory 820, a communication unit 830, an input unit 840, and an output unit 850. Functions of memory 820 and communication unit 830 of portable terminal 800 are similar to respective functions of memory 220 and communication unit 230 of facility server 200 described previously. Input unit 840 is implemented by a touch panel, an operation button, and a microphone and passes data inputted from the touch panel, the operation button, or the microphone to CPU 810. Output unit 850 is implemented by a display and a speaker, and has data from CPU 810 outputted from the display or the speaker. CPU 810 performs prescribed processing defined in the program in accordance with the program and the data stored in memory 820 and data inputted from an external apparatus to communication unit 830 and data inputted through input unit 840, and has data on a result of execution stored in memory 820 or outputs the data to the external apparatus from communication unit 830 or from output unit 850.

In battery replacement system 1 described above, the notification control method includes obtaining from replacement apparatus 21, by facility server 200, abnormality occurrence information relating to replacement of main battery 11, obtaining from replacement apparatus 21 or vehicle 10, by facility server 200, travel-enabled-state information indicating that main battery 11 is in an attachment state in which vehicle 10 is able to travel, causing, by facility server 200, display apparatus 250 to give first information indicating that the vehicle is able to travel when the abnormality occurrence information and the travel-enabled-state information are obtained, and causing, by facility server 200, display apparatus 250 to give second information indicating that the vehicle is unable to travel when the abnormality occurrence information is obtained and the travel-enabled-state information is not obtained.

Thus, when an abnormality in connection with replacement of main battery 11 of vehicle 10 occurs, so long as main battery 11 is in the attachment state in which vehicle 10 is able to travel, display apparatus 250 gives information indicating that vehicle 10 is able to travel to the user. On the other hand, when main battery 11 is not in the attachment state in which vehicle 10 is able to travel, display apparatus 250 gives information indicating that vehicle 10 is unable to travel to the user. Therefore, when vehicle 10 is abnormal in connection with replacement of main battery 11 whereas replacement apparatus 21 is normal, so long as main battery 11 is in the attachment state in which vehicle 10 is able to travel, in response to notification that vehicle 10 is able to travel, the user takes vehicle 10 out of replacement apparatus 21, so that the abnormality of vehicle 10 can be addressed outside replacement apparatus 21 and main battery 11 of another vehicle 10 can be replaced by replacement apparatus 21. When replacement apparatus 21 is abnormal in connection with replacement of main battery 11, so long as main battery 11 is in the attachment state in which vehicle 10 is able to travel, in response to the notification that vehicle 10 is able to travel, the user takes vehicle 10 out of replacement apparatus 21 so that repair works for replacement apparatus 21 are facilitated. Consequently, the user of vehicle 10 can be caused to take appropriate measures.

FIG. 3 is a flowchart showing a flow of processing for controlling notification about replacement of main battery 11 in this embodiment. Referring to FIG. 3, when vehicle 10 receives an obtainment request from facility server 200 at timing of start-up thereof, it outputs from DCM 14, start-up information indicating that vehicle 10 has been started up to facility server 200 over communication network 900.

CPU 210 of facility server 200 transmits the obtainment request to obtain the start-up information from communication unit 230 over communication network 900 to vehicle 10. When vehicle 10 is outputting the start-up information, CPU 210 of facility server 200 obtains the start-up information (step S111). The "start-up information" is expressed as "(A)" in FIG. 3.

CPU 210 of facility server 200 then obtains abnormality occurrence information relating to replacement of main battery 11 from replacement apparatus 21 (step S112). Specifically, CPU 210 transmits an obtainment request to obtain the abnormality occurrence information from communication unit 230 to replacement apparatus 21. The processor of replacement apparatus 21 determines whether or not it has received the obtainment request to obtain the abnormality occurrence information from facility server 200 (step S211). When the processor of replacement apparatus 21 determines that it has not received the obtainment request to obtain the abnormality occurrence information (NO in step S211), it has processing to be performed proceed to step S221.

When the processor of replacement apparatus 21 determines that it has received the obtainment request to obtain the abnormality occurrence information (YES in step S211), it determines whether or not the abnormality of vehicle 10 or replacement apparatus 21 has occurred during replacement of main battery 11 of vehicle 10 (step S212). When the processor of replacement apparatus 21 determines that the abnormality has not occurred (NO in step S212), it has processing to be performed proceed to step S221.

When the processor of replacement apparatus 21 determines that the abnormality has occurred (YES in step S212), it transmits the abnormality occurrence information indicating that the abnormality has occurred in vehicle 10 or replacement apparatus 21 to facility server 200 (step S213) and has processing to be performed proceed to step S221. Facility server 200 thus obtains the abnormality occurrence information. In FIG. 3, the "abnormality occurrence information" indicating that the abnormality has occurred in vehicle 10 during replacement of main battery 11 is expressed as "(B)". The "abnormality occurrence information" indicating that the abnormality has occurred in replacement apparatus 21 during replacement of main battery 11 is expressed as "(C)".

CPU 210 of facility server 200 then obtains from replacement apparatus 21, travel-enabled-state information indicating that main battery 11 is in the attachment state in which vehicle 10 is able to travel (step S113). Specifically, CPU 210 transmits an obtainment request to obtain the travel-enabled-state information from communication unit 230 to replacement apparatus 21. The processor of replacement apparatus 21 determines whether or not it has received the obtainment request to obtain the travel-enabled-state information from facility server 200 (step S221). When the processor of replacement apparatus 21 determines that it has not received the obtainment request to obtain the travel-enabled-state information (NO in step S221), it has processing to be performed return to higher-order processing from which this processing was called.

When the processor of replacement apparatus 21 determines that it has received the obtainment request to obtain the travel-enabled-state information (YES in step S221) and when an operation to replace main battery 11 is being performed (during the operation to replace main battery 11), it has the state of replacement apparatus 21 return to an initial position of a specific operation during a replacement operation or to a state before replacement (step S222). In this case, when the state of replacement apparatus 21 cannot return, the processor of replacement apparatus 21 may notify the outside that the state cannot return, by voice and sound, by an indicator, or by representation.

Thereafter, the processor of replacement apparatus 21 determines whether or not vehicle 10 during replacement of main battery 11 is able to travel (step S223).

For example, so long as main battery 11 is attached to vehicle 10 in a state in which it can normally supply electric power, vehicle 10 is determined as being in a state in which it is able to travel not only when fixing components (for example, bolts) for fixing main battery 11 to vehicle 10 are all properly attached (for example, fastened in the case of the bolts) but also when some of the components (for example, half or more such as at least two of four bolts) are properly attached. Thus, without being limited to the state described above, the state in which vehicle 10 is able to travel may be any other state in which the vehicle is able to travel although the state of attachment of main battery 11 is not perfect. The state in which vehicle 10 is able to travel may be such a state specified in advance in experiments or simulations that main battery 11 does not come off when the vehicle travels at a speed lower than a prescribed speed.

When main battery 11 is not attached to vehicle 10 in the state in which it can normally supply electric power and when some of the fixing components (for example, more than half such as at least three of four bolts) are not properly attached, vehicle 10 is determined as being in the state in which it is unable to travel. Thus, without being limited to the state described above, the state in which vehicle 10 is unable to travel may be any other state in which the vehicle is unable to travel. The state in which vehicle 10 is unable to travel may be such a state specified in advance in experiments or simulations that main battery 11 comes off when the vehicle travels, regardless of a speed.

The state of the fixing component for fixing main battery 11 to vehicle 10 and the state of attachment of main battery 11 may be detected by a sensor in vehicle 10 or replacement apparatus 21 or based on an image obtained by a camera.

When the processor of replacement apparatus 21 determines that vehicle 10 is unable to travel (NO in step S223), it has processing to be performed return to the higher-order processing from which this processing was called. When the processor of replacement apparatus 21 determines that vehicle 10 is able to travel (YES in step S223), it transmits travel-enabled-state information indicating that vehicle 10 is able to travel to facility server 200 (step S224) and has processing to be performed return to the higher-order processing from which this processing was called. Facility server 200 thus obtains the travel-enabled-state information. The "travel-enabled-state information" is expressed as "(D)" in FIG. 3.

CPU 210 of facility server 200 then determines whether or not it has obtained "A", "B", and "D" or "B" and "D" (step S121). When CPU 210 determines that it has not obtained "A", "B", and "D" and that it has not obtained "B" and "D" either (NO in step S121), it has processing to be performed proceed to step S123.

When CPU 210 determines that it has obtained "A", "B", and "D" or "B" and "D" (YES in step S121), it performs processing for causing the notification apparatus to give travel ability information indicating that vehicle 10 is able to travel and information recommending inspection of vehicle 10 (for example, by the user himself/herself or a worker after vehicle 10 is taken out of replacement apparatus 21) (for example, processing for representation on the display of display apparatus 250, processing for output of voice and sound from the speaker of display apparatus 250, processing for transmission of information to be given on HMI 15 of vehicle 10 from communication unit 230 over communication network 900 to vehicle 10, and processing for transmission of information to be given through output unit 850 of portable terminal 800 from communication unit 230 over communication network 900 to portable terminal 800) (step S122) and has processing to be performed proceed to step S123.

CPU 210 of facility server 200 determines whether or not it has obtained "C" and "D" (step S123). When CPU 210 determines that it has not obtained "C" and "D" (NO in step S123), it has processing to be performed proceed to step S131.

When CPU 210 determines that it has obtained "C" and "D" (YES in step S123), it performs processing for causing the notification apparatus to give the travel ability information indicating that vehicle 10 is able to travel and information recommending other measures (for example, information recommending replacement of main battery 11 by another replacement apparatus 21 and information recommending external charging of main battery 11) (for example, processing for representation on the display of display apparatus 250, processing for output of voice and sound from the speaker of display apparatus 250, processing for transmission of information to be given on HMI 15 of vehicle 10 from communication unit 230 over communication network 900 to vehicle 10, and processing for transmission of information to be given through output unit 850 of portable terminal 800 from communication unit 230 over communication network 900 to portable terminal 800) (step S124) and has processing to be performed proceed to step S131.

CPU 210 of facility server 200 determines whether or not it has obtained "A" and "B" or "A" and "C" (step S131). When CPU 210 determines that it has not obtained "A" and "B" and that it has not obtained "A" and "C" either (NO in step S131), it determines whether or not it has obtained "B" or "C" (step S132). When CPU 210 determines that it has not obtained "B" and that it has not obtained "C" either (NO in step S132), it has processing to be performed proceed to step S141.

When CPU 210 determines that it has obtained "A" and "B", "A" and "C", "B", or "C" (YES in step S131 or S132), it performs processing for causing the notification apparatus to give travel inability information indicating that vehicle 10 is unable to travel and a notification of a time period required for correction of the abnormality (for example, processing for representation on the display of display apparatus 250, processing for output of voice and sound from the speaker of display apparatus 250, processing for transmission of information to be given on HMI 15 of vehicle 10 from communication unit 230 over communication network 900 to vehicle 10, and processing for transmission of information to be given through output unit 850 of portable terminal 800 from communication unit 230 over communication network 900 to portable terminal 800) (step S133) and has processing to be performed proceed to step S141.

The time period required before correction of the abnormality is specified, for example, by storage of an average time period for correction of the abnormality in advance in mass-storage device 240 for each abnormal state, specifying the abnormal state, and reading the time period for correction for addressing the specified abnormal state from mass-storage device 240. The time period required before correction of the abnormality may be specified with another method.

Failure in obtainment of the travel-enabled-state information expressed as "D" may be caused by absence of supply of electric power from main battery 11 to auxiliary battery 16. Therefore, when electric power is not supplied from main battery 11 to ECU 12 and HMI 15 of vehicle 10 through the DC/DC converter, electric power is supplied thereto from auxiliary battery 16.

CPU 210 of facility server 200 determines whether or not it has obtained "A", "C", and "D" or "A" and "D" (step S141). When CPU 210 determines that it has not obtained "A", "C", and "D" and that it has not obtained "A" and "D" either, it has processing to be performed return to higher-order processing from which this processing on a facility server side was called.

When CPU 210 determines that it has obtained "A", "C", and "D" or "A" and "D", it performs processing (for example, processing for transmission of information for notification on HMI 15 of vehicle 10 from communication unit 230 over communication network 900 to vehicle 10) for causing the notification apparatus to provide a map screen for navigation shown in an ordinary state (step S142) and has processing to be performed return to the higher-order processing from which this processing on the facility server side was called. When "C" has been obtained, information indicating that the abnormality has occurred in replacement apparatus 21 is also included in the map screen.

MODIFICATION (1) In the embodiment described previously, as shown in FIGS. 1 and 2, main battery 11 of vehicle 10 is automatically replaced by replacement apparatus 21 at replacement station 20. Without being limited as such, main battery 11 of vehicle 10 may manually be replaced by a worker at replacement station 20.

(2) In the embodiment described previously, as shown in step S113 in FIG. 3, the travel-enabled-state information is obtained from replacement apparatus 21. Without being limited as such, the travel-enabled-state information may be obtained from vehicle 10.

(3) In the embodiment described previously, facility server 200 gives the user the information by causing display apparatus 250 of replacement station 20 to show the information. Without being limited as such, the notification apparatus that gives the user the information may be an apparatus different from display apparatus 250 of replacement apparatus 20, such as a speaker that outputs voice and sound provided in replacement station 20, a display or a speaker of HMI 15 of vehicle 10, or a display or a speaker of output unit 850 of portable terminal 800 of the user.

(4) In the embodiment described previously, CPU 210 of facility server 200 controls the notification apparatus. Without being limited as such, when HMI 15 of vehicle 10 serves as the notification apparatus, it may be ECU 12 of vehicle 10 that controls the notification apparatus, or when output unit 850 of portable terminal 800 of the user serves as the notification apparatus, it may be CPU 810 of portable terminal 800 that controls the notification apparatus.

(5) In the embodiment described previously, as shown in step S142 in FIG. 3, the notification apparatus is caused to provide the map screen when the start-up information and the travel-enabled-state information are received. Without being limited as such, the information to be given should only be information different from the travel ability information and the travel inability information. For example, a menu screen for information that can be shown on HMI 15 or a screen for information selected in the menu screen may be applicable.

(6) In the embodiment described previously, as shown in step S122 and step S124 in FIG. 3, when the abnormality occurs in vehicle 10, the information shown in step S122 is given, and when the abnormality occurs in replacement apparatus 21, the information shown in step S124 is given. Without being limited as such, so long as information different depending on in which of replacement apparatus 21 and vehicle 10 the abnormality has occurred is given, another type of information may be given.

(7) In the embodiment described previously, as shown in step S112 and step S211 to step S213 in FIG. 3, the vehicle normality information indicating that the vehicle is normal is the abnormality occurrence information obtained from replacement apparatus 21 which indicates that the abnormality has occurred not in vehicle 10 but in replacement apparatus 21. Without being limited as such, the vehicle normality information may be information obtained from vehicle 10 that indicates that vehicle 10 is normal as a result of self-diagnosis by ECU 12 of vehicle 10.

(8) In the embodiment described previously, as shown in step S142 in FIG. 3, when the information indicating that vehicle 10 is normal and the start-up information are obtained regardless of obtainment of the abnormality occurrence information and the travel-enabled-state information, the third information (for example, map information) includes information indicating that the abnormality has occurred in replacement apparatus 21. Without being limited to giving the information indicating that the abnormality has occurred in replacement apparatus 21 simultaneously with the third information, the information indicating that the abnormality has occurred in replacement apparatus 21 may be given at timing different from the third information (for example, timing after the third information is shown).

(9) The embodiment described previously can be understood as the disclosure of battery replacement system 1, vehicle 10, management server 100, facility server 200, or portable terminal 800, or can be understood as the disclosure of a control processing method or a control processing program that performs prescribed processing performed by battery replacement system 1, vehicle 10, management server 10, facility server 200, or portable terminal 800.

SUMMARY (1) As shown in FIGS. 1 to 3, the notification control method is a notification control method by a notification control device (for example, facility server 200, the processor of replacement apparatus 21, ECU 12 of vehicle 10, or CPU 810 of portable terminal 800) that causes a notification apparatus (for example, the display or the speaker of display apparatus 250, replacement station 20, vehicle 10, or portable terminal 800) to give information on replacement apparatus 21 that replaces main battery 11 where electric power to be used for travel is stored, main battery 11 being mounted on vehicle 10. As shown in FIGS. 1 and 2, replacement apparatus 21 is an apparatus for replacement of main battery 11. As shown in FIG. 3, the notification control method includes obtaining from replacement apparatus 21, by the notification control device, abnormality occurrence information relating to replacement of main battery 11 (for example, step S112 and steps S211 to step S213), obtaining from replacement apparatus 21 or vehicle 10, by the notification control device, travel-enabled-state information indicating that main battery 11 is in an attachment state in which vehicle 10 is able to travel (for example, step S113 and step S221 to step S224), causing, by the notification control device, the notification apparatus to give first information indicating that the vehicle is able to travel (for example, step S121 to step S124) when the abnormality occurrence information and the travel-enabled-state information are obtained, and causing, by the notification control device, the notification apparatus to give second information indicating that the vehicle is unable to travel (for example, step S131 to step S133) when the abnormality occurrence information is obtained and the travel-enabled-state information is not obtained.

Thus, on the occurrence of an abnormality in connection with replacement of main battery 11 of vehicle 10, so long as main battery 11 is in the attachment state in which vehicle 10 is able to travel, the notification apparatus gives information indicating that vehicle 10 is able to travel to the user. On the other hand, when main battery 11 is not in the attachment state in which vehicle 10 is able to travel, the notification apparatus gives information indicating that vehicle 10 is unable to travel to the user. Therefore, when vehicle 10 is abnormal in connection with replacement of main battery 11 whereas replacement apparatus 21 is normal, so long as main battery 11 is in the attachment state in which vehicle 10 is able to travel, in response to the notification that vehicle 10 is able to travel, the user takes vehicle 10 out of replacement apparatus 21, so that the abnormality of vehicle 10 can be addressed outside replacement apparatus 21 and main battery 11 of another vehicle 10 can be replaced by replacement apparatus 21. When replacement apparatus 21 is abnormal in connection with replacement of main battery 11, so long as main battery 11 is in the attachment state in which vehicle 10 is able to travel, in response to the notification that vehicle 10 is able to travel, the user takes vehicle 10 out of replacement apparatus 21, which facilitates repair works for replacement apparatus 21. Consequently, the user of vehicle 10 can be caused to take appropriate measures.

(2) As shown in FIGS. 1 and 2, the notification apparatus may be HMI 15 provided in vehicle 10, and when the abnormality occurrence information is obtained and the travel-enabled-state information is not obtained, HMI 15 may be supplied with electric power from auxiliary battery 16 of vehicle 10.

Thus, even when the abnormality in connection with replacement of main battery 11 of vehicle 10 occurs and electric power cannot be supplied from main battery 11, electric power can be supplied from auxiliary battery 16 to the notification apparatus of vehicle 10. Consequently, even when the abnormality in connection with replacement of main battery 11 occurs, information can be conveyed to the user.

(3) As shown in FIG. 3, the notification control method may further include obtaining from vehicle 10, by the notification control device, start-up information indicating that vehicle 10 has been started up (for example, step S111), causing, by the notification control device, the notification apparatus to give third information (for example, the map screen) different from the first information and the second information (for example, step S141 and step S142) when the travel-enabled-state information and the start-up information are obtained, and causing, by the notification control device, the notification apparatus to give the first information or the second information rather than the third information (for example, step S121, step S122, step S131, and step S133) when the abnormality occurrence information and the start-up information are obtained.

Thus, so long as the abnormality in connection with replacement of main battery 11 has not occurred at the time of start-up of vehicle 10 while main battery 11 is in the attachment state in which vehicle 10 is able to travel, the third information different from information indicating whether or not the vehicle is able to travel is given to the user. When the abnormality in connection with replacement of main battery 11 has occurred at the time of start-up of vehicle 10, the information indicating whether or not the vehicle is able to travel rather than the third information is given to the user. Consequently, by preferentially giving necessary information depending on a situation, information can appropriately be conveyed to the user.

(4) As shown in FIG. 3, the notification control method may further include obtaining from replacement apparatus 21 or vehicle 10, by the notification control device, vehicle normality information indicating that vehicle 10 is normal (for example, step S112) and causing, by the notification control device, the notification apparatus to give the third information when the vehicle normality information and the start-up information are obtained regardless of obtainment of the abnormality occurrence information and the travel-enabled-state information (for example, step S141 and step S142).

Thus, when vehicle 10 is normal in spite of the fact that the abnormality in connection with replacement of main battery 11 has occurred but main battery 11 is in the attachment state in which vehicle 10 is able to travel, information different from the information indicating whether or not vehicle 10 is able to travel is given to the user. Consequently, the user can be given such an impression that vehicle 10 is normal.

(5) As shown in FIG. 3, the notification control method may further include obtaining, by the notification control device, abnormal apparatus information indicating in which of replacement apparatus 21 and vehicle 10 an abnormality has occurred (for example, step S112) when the abnormality occurrence information is obtained and causing, by the notification control device, the notification apparatus to give information different depending on in which of replacement apparatus 21 and vehicle 10 the abnormality has occurred (for example, step S121 to step S124) when the abnormal apparatus information is obtained.

Thus, when the abnormal apparatus information indicates that it is vehicle 10 where the abnormality has occurred, recommendation for inspection of vehicle 10 on the spot without the vehicle reaching a public roadway can be given after vehicle 10 is taken out of replacement apparatus 21. When the abnormal apparatus information indicates that it is replacement apparatus 21 where the abnormality has occurred, recommendation for replacement of main battery 11 by another replacement apparatus 21 or external charging of main battery 11 can be given.

(6) As shown in step S222 in FIG. 3, main battery 11 being in the attachment state in which vehicle 10 is able to travel may be determined while the replacement apparatus is in a state of standstill at an initial position of a specific operation during replacement of main battery 11.

Thus, determination that main battery 11 is in the attachment state in which vehicle 10 is able to travel can more appropriately be made when the determination is made in the state of standstill at the initial position of the specific operation than when the determination is made in the state of standstill at a position during the specific operation.

(7) As shown in step S222 in FIG. 3, main battery 11 being in the attachment state in which vehicle 10 is able to travel may be determined in a state in which return to a state before start of replacement of main battery 11 has been completed.

Thus, determination that main battery 11 is in the attachment state in which vehicle 10 is able to travel can more appropriately be made when the determination is made in the state in which return to the state before start of replacement of main battery 11 has been completed than when the determination is made in a state in which return to the state before start of replacement of main battery 11 has not been completed.

(8) As shown in step S133 in FIG. 3, the notification control method may further include causing, by the notification control device, the notification apparatus to give a notification of a time period required for correction of an abnormality in connection with replacement of main battery 11.

Thus, the user can be notified of the time period required for correction of the abnormality in connection with replacement of main battery 11.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A notification control method by a notification control device that causes a notification apparatus to give information on a replacement apparatus that replaces a power storage where electric power to be used for travel is stored, the power storage being mounted on a vehicle, the notification control method comprising:
    obtaining from the replacement apparatus, by the notification control device, abnormality occurrence information relating to replacement of the power storage;
    obtaining from the replacement apparatus or the vehicle, by the notification control device, travel-enabled-state information indicating that the power storage is in an attachment state in which the vehicle is able to travel;
    causing, by the notification control device, the notification apparatus to give first information indicating that the vehicle is able to travel when the abnormality occurrence information and the travel-enabled-state information are obtained; and
    causing, by the notification control device, the notification apparatus to give second information indicating that the vehicle is unable to travel when the abnormality occurrence information is obtained and the travel-enabled-state information is not obtained.

2. The notification control method according to claim 1, wherein
    the notification apparatus is provided in the vehicle, and
    when the abnormality occurrence information is obtained and the travel-enabled-state information is not obtained, the notification apparatus is supplied with electric power from an auxiliary battery of the vehicle.

3. The notification control method according to claim 2, further comprising:
    obtaining from the vehicle, by the notification control device, start-up information indicating that the vehicle has been started up;
    causing, by the notification control device, the notification apparatus to give third information different from the first information and the second information when the travel-enabled-state information and the start-up information are obtained; and
    causing, by the notification control device, the notification apparatus to give the first information or the second information rather than the third information when the abnormality occurrence information and the start-up information are obtained.

4. The notification control method according to claim 3, further comprising:
    obtaining from the replacement apparatus or the vehicle, by the notification control device, vehicle normality information indicating that the vehicle is normal; and
    causing, by the notification control device, the notification apparatus to give the third information when the vehicle normality information and the start-up information are obtained regardless of obtainment of the abnormality occurrence information and the travel-enabled-state information.

5. The notification control method according to claim 1, further comprising:
    obtaining, by the notification control device, abnormal apparatus information indicating in which of the replacement apparatus and the vehicle an abnormality has occurred when the abnormality occurrence information is obtained; and
    causing, by the notification control device, the notification apparatus to give information different depending on in which of the replacement apparatus and the vehicle the abnormality has occurred when the abnormal apparatus information is obtained.

6. The notification control method according to claim 1, wherein
    the power storage being in the attachment state in which the vehicle is able to travel is determined while the replacement apparatus is in a state of standstill at an initial position of a specific operation during replacement of the power storage.

7. The notification control method according to claim 1, wherein
    the power storage being in the attachment state in which the vehicle is able to travel is determined in a state in which return to a state before start of replacement of the power storage has been completed.

8. The notification control method according to claim 1, further comprising causing, by the notification control device, the notification apparatus to give a notification of a time period required for correction of an abnormality in connection with replacement of the power storage.

9. A notification control device that causes a notification apparatus to give information on a replacement apparatus that replaces a power storage where electric power to be used for travel is stored, the power storage being mounted on a vehicle, the notification control device
    obtaining from the replacement apparatus, abnormality occurrence information relating to replacement of the power storage,
    obtaining from the replacement apparatus or the vehicle, travel-enabled-state information indicating that the power storage is in an attachment state in which the vehicle is able to travel,
    causing the notification apparatus to give first information indicating that the vehicle is able to travel when the abnormality occurrence information and the travel-enabled-state information are obtained, and
    causing the notification apparatus to give second information indicating that the vehicle is unable to travel when the abnormality occurrence information is obtained and the travel-enabled-state information is not obtained.

* * * * *